United States Patent [19]

Hart

[11] 4,225,193
[45] Sep. 30, 1980

[54] CONTROL VALVE ARRANGEMENT FOR COMBINED BRAKE CYLINDER AND RESERVOIR

[75] Inventor: James E. Hart, Trafford, Pa.

[73] Assignee: American Standard Inc., Wilmerding, Pa.

[21] Appl. No.: 35,117

[22] Filed: May 1, 1979

[51] Int. Cl.³ .............................................. B60T 15/22
[52] U.S. Cl. .......................................... 303/35; 92/64; 303/36; 303/86
[58] Field of Search .................... 303/35, 9, 36, 81, 86, 303/40, 30, 33, 57, 62, 64, 68, 70, 80; 92/64, 212, 49

[56] References Cited

U.S. PATENT DOCUMENTS

| 2,031,213 | 2/1936 | Farmer | 303/35 |
| 4,058,348 | 11/1977 | Hart | 303/35 |

Primary Examiner—Douglas C. Butler

Attorney, Agent, or Firm—G. J. Falce; R. W. McIntire, Jr.

[57] ABSTRACT

Brake apparatus for a railway vehicle including a brake cylinder device of the type having a pair of interconnected pistons to which the vehicle brake rigging is connected, the larger piston having a pair of chambers formed on opposite sides in which air is stored, and a control valve device that is operative responsive to a reduction of brake pipe pressure to connect pressure from the one side of the larger piston to a corresponding side of the smaller piston to effect movement of these pistons to a brake application position and concurrently vents pressure in the chamber on the other side of the larger piston. A transfer valve device is provided to interrupt this exhaust of pressure from the chamber on the other side of the piston until the piston has moved to application position so that the chamber volume is minimal and thus renders a minimum amount of air exhaust sufficient to produce brake applying pressure differentials across this larger piston.

12 Claims, 3 Drawing Figures

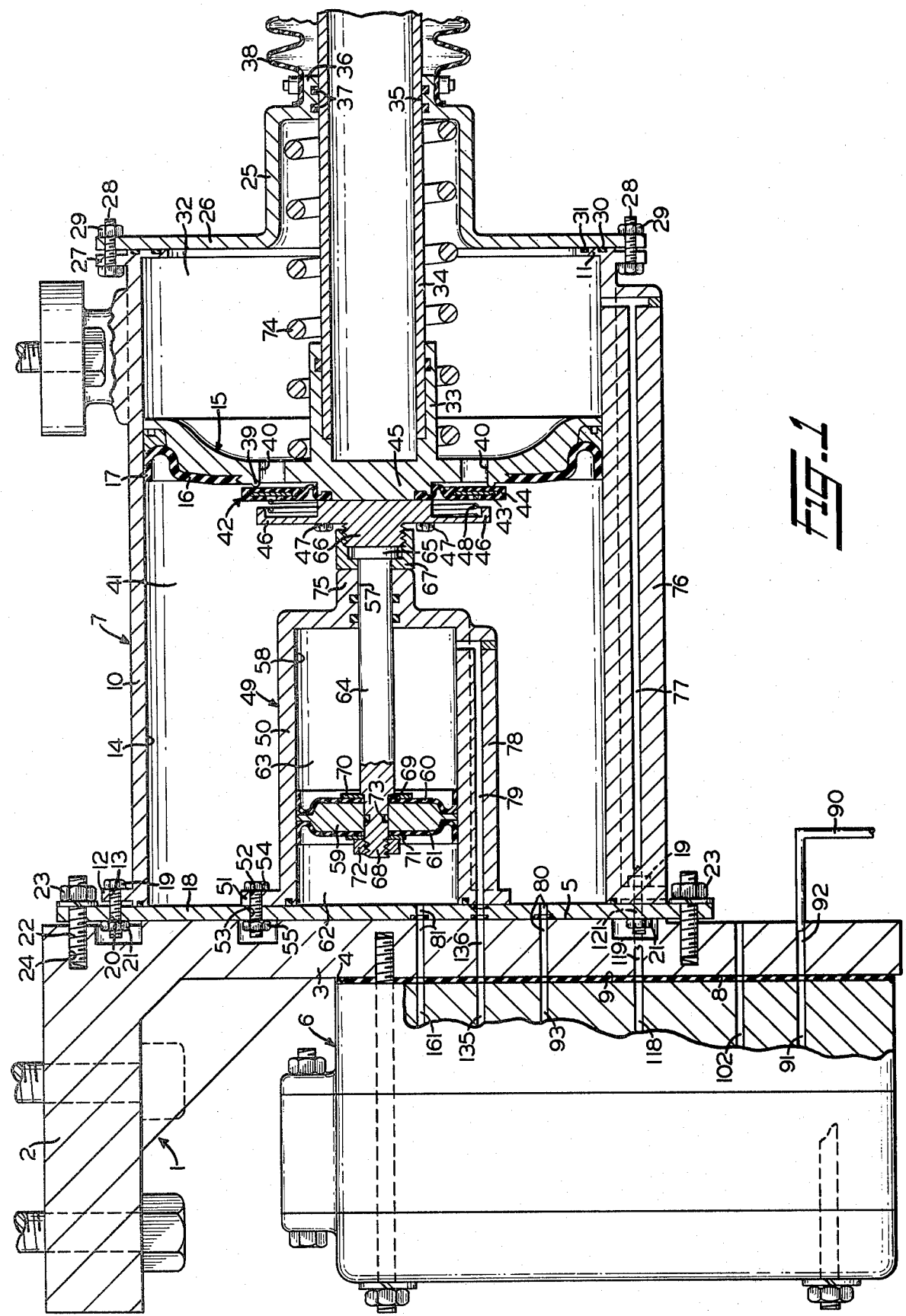

CONTROL VALVE ARRANGEMENT FOR COMBINED BRAKE CYLINDER AND RESERVOIR

BACKGROUND OF THE INVENTION

The present invention is related to brake apparatus for a railway vehicle and particularly to such brake apparatus as disclosed in U.S. Pat. No. 4,058,348, issued Nov. 15, 1977 to the assignee of the present invention, wherein a brake cylinder device is arranged to provide for storage of sufficient air as necessary to develop the desired brake forces without the need for conventional storage reservoirs.

In the above-mentioned patent, the brake cylinder device embodies a pair of tandem-connected pistons of unequal diameter. The larger power piston cooperates with the brake cylinder body to form on the respective opposite sides thereof a chamber for the storage of air supplied via the train brake pipe, while the smaller positioning piston cooperates with the cylinder housing to also provide on its opposite sides fluid pressure chambers.

A control valve device is operative in response to a reduction of the brake pipe pressure to connect the air stored in the chamber on one side of the power piston to the chamber formed on the corresponding side of the positioning piston to effect pressure equalization therebetween. A one-way check valve associated with the power piston provides for the pressure on the other side of the power piston to equalize with the reduced pressure on the one side thereof to prevent a pressure differential from developing across the power piston, as the positioning piston is actuated in response to the pressure acting thereon. In this manner, the power piston is shifted in an application direction in order to decrease the volume on the other side thereof, while concurrently the pressure in this chamber is reduced in some proportion to the brake pipe reduction. This creates a pressure differential across the power piston to produce the desired brake application forces. Inasmuch as the volume of this other chamber from which air is exhausted is reduced by movement of the tandem-connected pistons in a brake application direction, the desired pressure reduction therein is obtained with only a minimum amount of air loss, thus making possible the use of a normal sized brake cylinder for the additional purpose of a storage reservoir.

It should be apparent from the foregoing that in order to obtain optimum benefit of low air consumption, movement of the power piston to brake application position should occur prior to the exhaust of any air from the chamber formed on the other side of the power piston, so that the volume thereof is reduced to a minimum before any air is exhausted.

SUMMARY OF THE INVENTION

An object of the invention, therefore, is to provide movement of the power piston to application position and subsequent venting of air therefrom in a sequential manner.

It is a further object of the invention to provide movement of the power piston to application position by the positioning piston with a predetermined force in response to a minimum service reduction of brake pipe pressure, without subsequently venting air from the power piston, in order to limit the brake application force to a predetermined value corresponding to a minimum service brake application.

The foregoing objectives are realized according to the present invention by providing a brake cylinder device for a railway freight car that embodies a pair of tandem-connected pistons of unequal size, each being respectively slidably mounted in a bore in one of a pair of separate hollow cylindrical members. The smaller cylindrical member is disposed within the larger cylindrical member on one side of the larger piston, which divides the larger hollow cylindrical member into two fluid pressure storage chambers. The larger piston is provided with a check valve to enable flow of fluid pressure in a single direction from the storage chamber at one side of this piston to the storage chamber at the other side. The adjacent sides of the two pistons are connected by a first piston rod and the other side of the larger piston is connected by a larger piston rod and conventional brake rigging to one or more braking elements for effecting a brake application on the tread surface of one or more wheels of the freight car.

A novel brake control valve device is effective, in response to fully charging a train brake pipe, to charge the mentioned two storage chambers on the respective opposite sides of the larger piston, and also a chamber on the adjacent side of the smaller piston, to the fully charged pressure in the train brake pipe. This control valve device is thereafter responsive to a reduction of the pressure in the train brake pipe to simultaneously cause the release of fluid pressure from the chamber on the adjacent side of the smaller piston to atmosphere and also an equalization of fluid pressure in the two storage chambers on the respective opposite sides of the larger piston into a chamber on the other side of the smaller piston to thereby effect simultaneous shifting of the two pistons to a brake application position. The fluid pressure differential across this smaller piston required to effect shifting of the two pistons to application position is sensed by a transfer valve device, which prevents the venting of pressure from the storage chamber on one side of the larger piston until this pressure differential is established. Once this occurs, the transfer valve device is actuated to a position in which fluid pressure is connected from the reduced volume chamber on one side of the larger piston to atmosphere via an exhaust valve, thereby providing a pressure differential across the larger piston to provide a brake application force. Since the exhaust of fluid pressure from the chamber on one side of the larger piston is withheld until the piston has moved to application position, the chamber volume is reduced and consequently only a minimum amount of air is exhausted to obtain the desired pressure reduction.

BRIEF DESCRIPTION OF THE DRAWINGS

These and other objects and advantages of the invention will become apparent from the following more detailed description when taken with the accompanying drawings in which:

FIG. 1 is a cross-sectional view of a brake cylinder device and an outline view of a novel control valve device, each shown mounted to a common pipe bracket via which appropriate fluid pressure communication is established therebetween.

DESCRIPTION

Figure 2A:
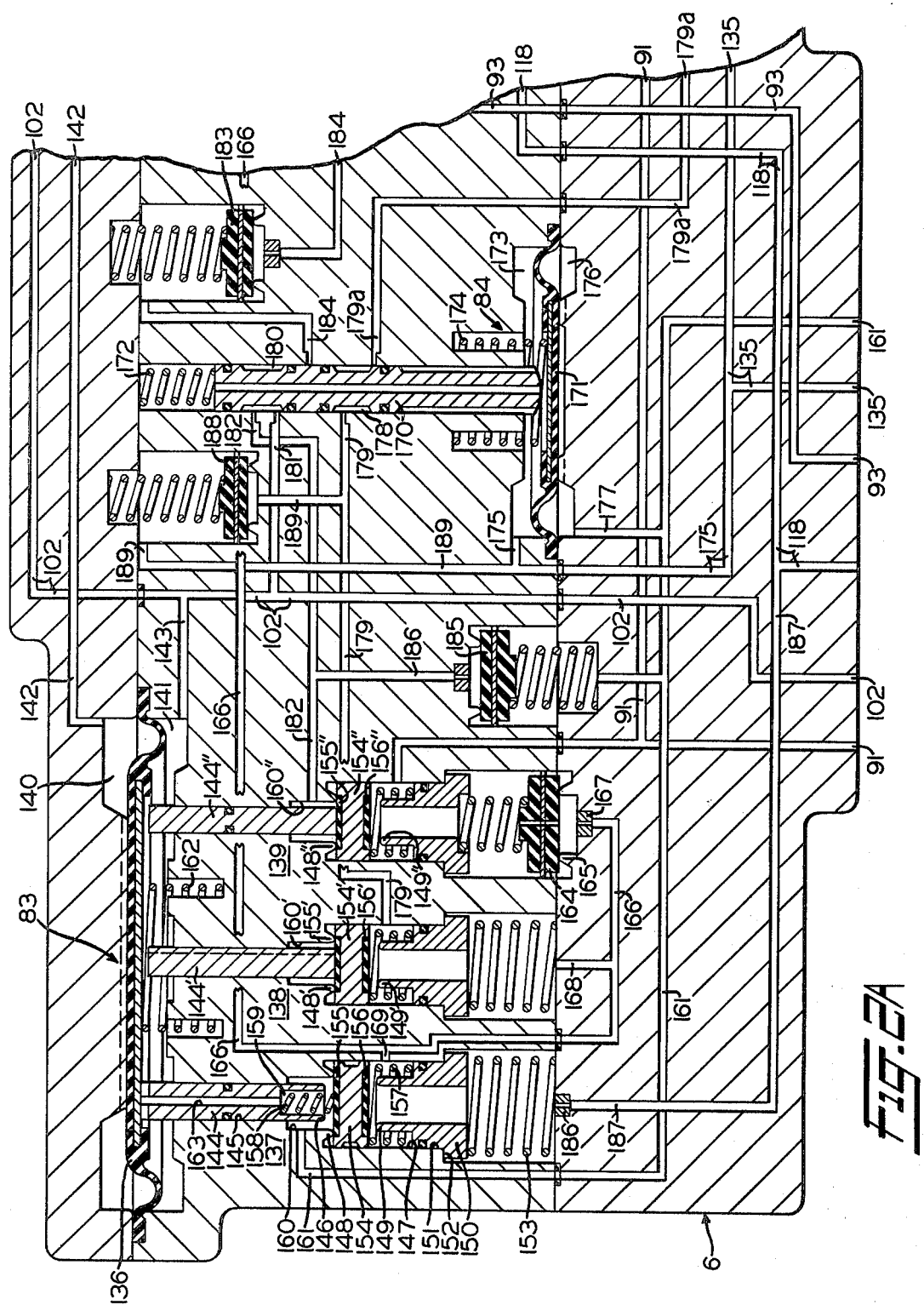
FIGS. 2A and 2B, taken together, show a section diagrammatic view of the novel brake control valve device shown in outline in FIG. 1.

As shown in FIG. 1 of the drawings, a novel railway freight car fluid pressure brake apparatus constituting the present invention comprises a pipe bracket 1 that has a horizontal leg 2 and a vertical leg 3. The vertical leg 3 has gasket faces 4 and 5 disposed opposite each other.

The brake apparatus shown in FIG. 1 further comprises a novel brake control valve device 6 secured to the gasket face 4 on the left-hand side of the vertical leg 3 of the pipe bracket 1, and a brake cylinder device 7 secured to the gasket face 5 on the right-hand side of this leg 3, a ported gasket 8 being disposed between the gasket face 4 on the leg 3 and a gasket face 9 on the right-hand side of the brake control valve device 6.

Brake cylinder device 7 comprises a hollow cylindrical member 10 that may be in the form of a casting that has formed integral with its right-hand end an inturned flange 11. Adjacent its left-hand end an outturned flange 12 is formed integral therewith. This outturned flange 12 is provided with a plurality of arcuately-arranged smooth bores 13, only one of which appears in FIG. 1.

Formed in cylindrical member 10, as by machining, is a counterbore 14 that extends inward from the left-hand end of this cylindrical member to the inturned flange 11. Slidably mounted in the counterbore 14 is a fluid-pressure-actuated power piston 15.

In order to provide a seal between the wall of the counterbore 14 and the piston 15, there is provided an annular packing cup 16 that is disposed on the left-hand side of this piston 15. This packing cup 16 has an outer portion 17 that is U-shaped in contour, with the inner leg thereof merging with or abutting the left-hand side of the piston 15 and the outer leg slidably engaging the wall surface of the counterbore 14 for preventing leakage of fluid under pressure from the left-hand side of the piston 15 to the right-hand side.

The left-hand end of the counterbore 14 is closed by a pressure head 18 that is secured to the left-hand end of the cylindrical member 10 by a plurality of bolts 19 that extend through the bores 13 in the outturned flange 12 and a like number of arcuately-arranged smooth bores 20 in the pressure head 18 and a like number of nuts 21 that have screw-threaded engagement with these bolts 19.

The pressure head 18 is secured to the gasket face 5 on the right-hand side of the leg 3 of the pipe bracket 1 by a plurality of studs 22 and nuts 23, the left-hand screw-threaded end of these studs 22 having screw-threaded engagement with internal screw threads provided in a like number of bottomed bores 24 in the leg 3 of pipe bracket 1.

As shown in FIG. 1, the right-hand end of the counterbore 14 is closed by a second pressure head 25 that at its left-hand end has formed integral therewith an outturned flange 26 which abuts the inturned flange 11 that is integral with the right-hand end of the cylindrical member 10.

Adjacent its right-hand end, the cylindrical member 10 is provided with an outturned flange 27, the outer diameter of which is the same as that of the outturned flange 26. These outturned flanges 26 and 27 are provided with a plurality of arcuately-spaced coaxial smooth bores through which extend a like number of bolts 28. A nut 29 screw-threaded onto the end of each bolt 28 clamps the outturned flange 26 against the inturned flange 11.

The flange 11 is provided with two concentric grooves in which are disposed a pair of annular gaskets 30 and 31 that form a seal with the outturned flange 26 to prevent leakage of fluid under pressure from a pressure chamber or storage reservoir 32 formed by the cylindrical member 10, piston 15 and pressure head 25.

Formed integral with the right-hand side of the piston 15 is an annular boss 33 into which is press-fitted one end of a hollow rod 34 that extends through a bore 35 in an annular boss 36 formed on the right-hand end of the pressure head 25. The wall of the bore 35 is provided with a pair of spaced-apart annular grooves in each of which is disposed an O-ring seal 37 that forms a seal with the outer periphery of the hollow rod 34 to prevent leakage of fluid under pressure from the pressure chamber 32 to atmosphere.

A piston rod (not shown) may be disposed within the hollow rod 34 and connected through a suitable brake rigging (not shown) to brake shoes (not shown) that may be forced against the tread surface of the wheels of a railway vehicle to effect a brake application thereon.

A rubber boot 38 surrounds that portion of the hollow rod 34 that extends outside of the pressure head 25 to protect the outside smooth surface of this rod 34 from damage by such as a piece of flying ballast from a railroad roadbed.

As shown in FIG. 1, the left-hand side of the piston 15 is provided with an annular bead 39. On the inside of this bead 39, the piston 15 is provided with a plurality of arcuately-spaced bores 40. Flow of fluid under pressure from the pressure chamber 32 on the right-hand side of the piston 15 to a pressure chamber or storage reservoir 41 on the left-hand side of this piston via the bores 40 is normally closed by a one-way valve device 42 that will now be described in detail.

An annular metallic member 43 is embedded in an annular member 44 that is made from some suitable resilient material such as, for example, rubber. The inner periphery of this resilient annular member 44 is clamped between a central boss 45 formed on the left-hand side of the piston 15 and a cup-shaped spring seat 46 that is secured to the piston 15 by a plurality of arcuately-arranged cap screws 47. A spring 48 interposed between the spring seat 46 and the annular metallic member 43 normally biases the resilient annular member 44 against the annular bead 39 to close communication between chamber 32 and chamber 41, which chambers constitute two fluid pressure storage reservoirs that are charged with fluid under pressure in a manner hereinafter described.

The novel brake cylinder device 7 further comprises a positioning cylinder device 49 that is disposed within the chamber 41. This positioning cylinder device 49 comprises a cup-shaped cylinder body 50, the left-hand end of which is provided with an outturned flange 51 that has a plurality of arcuately-arranged smooth bores 52 which are coaxial with a like number of arcuately-arranged smooth bores 53 in the pressure head 18. A plurality of bolts 54 extend through the bores 52 and 53 and have screw-threaded engagement with a like number of nuts 55 that are disposed within recesses 56 provided therefor in the gasket face 5 on the right-hand side of the leg 3 of the pipe bracket 1. Thus, the bolts 54 and nuts 55 secure the positioning cylinder device 49 to the pressure head 18 within the pressure chamber 41.

The cylinder body 50 is provided with a bore 57 and a coaxial counterbore 58. Slidably mounted within the counterbore 58 is an annular positioning piston 59 that has secured to its respective opposite sides a pair of annular packing cups 60 and 61, each having an outer portion that is U-shaped in contour so as to form a seal with the wall surface of the counterbore 58. These packing cups 60 and 61 and the piston 59 thus form a pair of chambers 62 and 63 on the respective opposite sides of the piston 59.

The piston 59 is operatively connected to the piston 15 by a piston rod 64 that has formed on its right-hand end a collar 65 that abuts a screw-threaded boss 66 formed on the left-hand side of the spring seat 46. A cup-shaped nut 67 surrounds the collar 65 and has screw-threaded engagement with the screw threads on the boss 66 to connect the piston rod 64 to the piston 15.

Adjacent its left-hand end, the piston rod 64 is provided with a portion 68 of reduced diameter that has a shoulder 69 at its right-hand end and screw threads extending inward a chosen distance from its left-hand end. A first annular plate 70 abuts the shoulder 69 and also the right-hand side of the packing cup 60 while a second annular plate 71 is disposed between the left-hand side of the packing cup 61 and a nut 72 that has screw-threaded engagement with the screw threads on the portion 68. Thus, the nut 72 and plates 70 and 72 serve to rigidly secure the piston 59 to the piston rod 64.

An O-ring seal 73 is disposed in a peripheral annular groove formed on the portion 68 of the piston rod 64 and forms a seal with the annular piston 59 to prevent leakage of fluid under pressure between the chambers 62 and 63.

A brake release spring 74 is interposed between the pressure head 25 and the right-hand side of the larger power piston 15 to normally bias this power piston 15, and also the smaller positioning piston 59, to the release position shown, in which position the cup-shaped nut 67 is biased against the right-hand end of annular boss 75 that is formed integral with the right-hand end of the cylinder body 50.

In order to provide for the supply of fluid under pressure to the chamber 32 on the right-hand side of the larger power piston 15, in a manner hereinafter described, the cylindrical member 10 has formed on its bottom a longitudinally extending boss 76 through which extends a passageway 77 that opens into this chamber 32.

Likewise, in order to provide for the supply of fluid under pressure to the chamber 63 on the right-hand side of the smaller positioning piston 59, in a manner hereinafter described, the cylinder body 50 has formed on its bottom a longitudinally extending boss 78 through which extends a passageway 79 that opens into this chamber 63.

A passageway 80 extends through the leg 3 of the pipe bracket 1 and the pressure head 18 and opens into the chamber 41 on the left-hand side of the larger piston 15. Also, a passageway 81 extends through this leg 3 and pressure head 18 and opens into the chamber 62 on the left-hand side of the smaller piston 59.

Figure 2B:
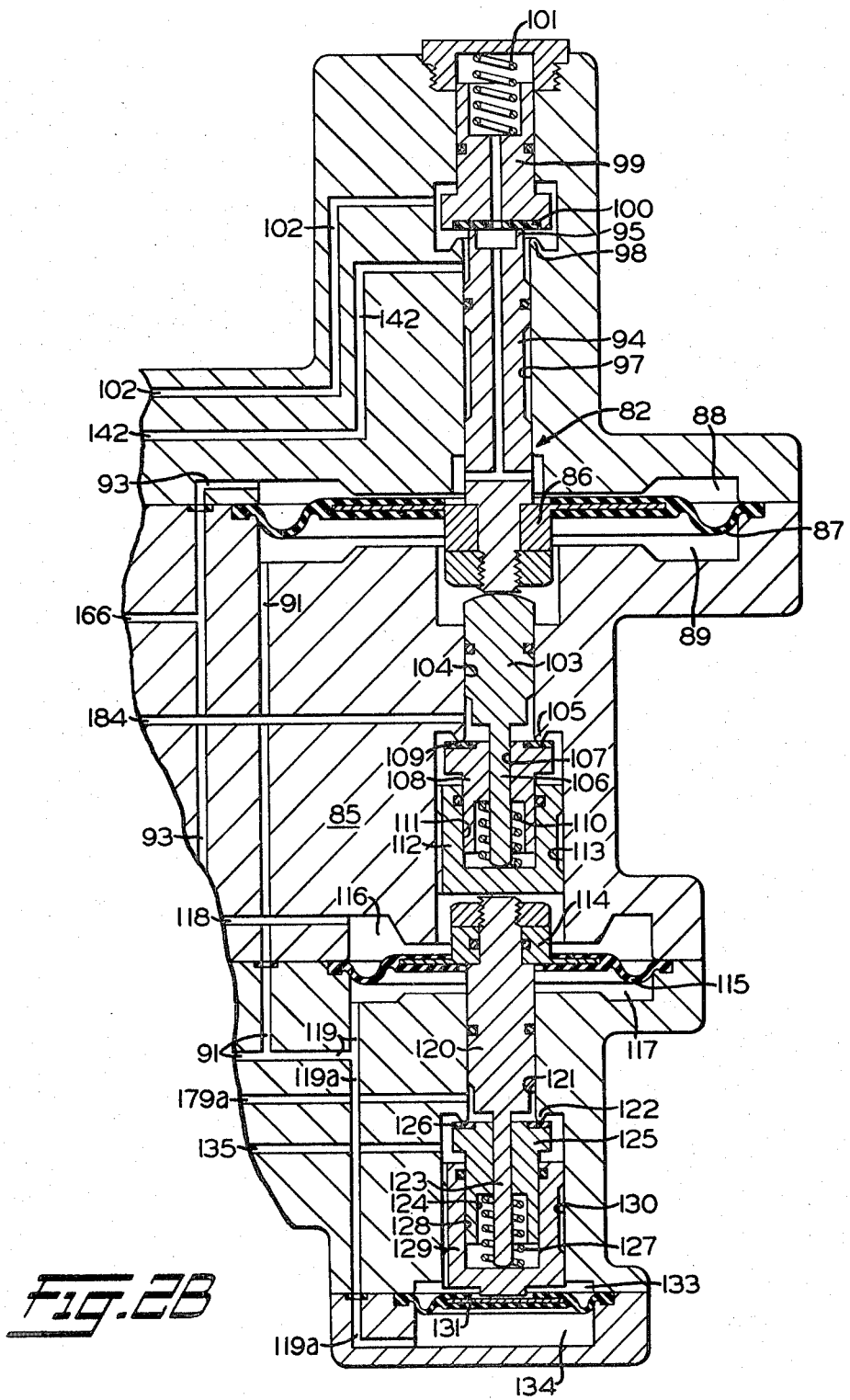

As shown in FIG. 2, the novel brake control valve device 6 includes a diaphragm piston operated, self-lapping valve assembly 82, a pilot operated poppet valve assembly 83 and a transfer valve 84, all arranged by conventional means in a body 85.

Self-lapping valve assembly 82 comprises a movable piston abutment 86 having a diaphragm 87 with pressure chambers 88 and 89 formed on opposite sides thereof. Chamber 88 is connected to a brake pipe 90 via passageway 91 in control valve body 85 and a passageway 92 in pipe bracket leg 3. Chamber 89 is connected to chamber 62 of brake cylinder device 7 via passageway 93 in control valve body 85 and passage 80 in pipe bracket leg 3. A stem 94 of piston abutment 86 terminates in an annular pilot valve seat 95, the inner circumference of which is connected to chamber 88 via a passage 96 in stem 94. Stem 94 operates in a bore 97 that terminates in an annular exhaust valve seat 98 in surrounding relationship with seat 95. A valve member 99 having an annular seal element 100 is arranged for engagement with seats 95 and 98 under the bias effect of a spring 101. The outer peripheral area of valve seat 98 is connected to atmosphere via a passageway 102.

The side of abutment 86 opposite stem 94 is engageable with a push rod 103 that operates in a bore 104 that terminates in an annular exhaust valve seat 105. At the end of push rod 103 opposite the end engageable with abutment 86, rod 103 is provided with a reduced diameter section 106 that projects through an opening 107 in an application valve member 108 having an annular seal element 109 engageable with seat 105 under the influence of a spring 110. Valve member 108 is movably supported in a closed bore 111 of a guide member 112 that is movably disposed in a bore 113, spring 110 being caged between the bottom of closed bore 111 of member 112 and valve member 108.

Self-lapping valve assembly 82 further comprises a movable piston abutment 114 with which guide member 112 is engageable. Abutment 114 includes a diaphragm 115 having formed on opposite sides pressure chambers 116 and 117. Chamber 116 is connected to the outer periphery of valve seat 105 via a fluted passage in guide member 112 and to chamber 32 of brake cylinder 7 via passageway 118 in control valve body 85, passage 119 in pipe bracket leg 3 and passage 77 in longitudinal boss 76 of cylindrical member 10. Chamber 117 is connected to brake pipe passageway 91 via branch passage 119. A stem 120 of abutment 114 operates in a bore 121 that terminates in an annular exhaust valve seat 122. Stem 120 is provided with a reduced diameter end portion 123 that projects through an opening 124 in a valve member 125 having an annular seal element 126 adapted to engage seat 122 under the influence of a spring 127. Spring 127 acts between valve member 125 and a closed end of a guide bore 128 of a guide member 129, in which valve member 125 is operatively supported. Guide member 129 is, in turn, movably supported in a counterbore 130 and is engageable with a movable piston abutment 131 of self-lapping valve assembly 82.

Abutment 131 includes a diaphragm 132 having formed on opposite sides pressure chambers 133 and 134. Chamber 133 is connected to chamber 63 of the brake cylinder positioning cylinder device 49 via a fluted passage in guide member 129, the outer periphery of valve seat 122, a passageway 135 in control valve body 85, a passage 136 in pipe bracket leg 3 and passageway 79 in longitudinal boss 78 of positioning cylinder device 49. Chamber 134 is connected to brake pipe 90 via a branch passage 119a, branch passage 119 and passage 91.

Poppet valve assembly 83 comprises a movable diaphragm-type pilot piston 136 and substantially identical poppet valve devices 137, 138, and 139 that are adapted to be operated by piston 136. On one side of piston 36, there is formed a pressure chamber 140 and on the opposite side there is formed an atmospheric chamber 141. Chamber 140 is connected to the annular area between annular valve seats 95 and 98 via a passage 142, while chamber 141 is connected to atmospheric passage 102 via a branch passage 143. In that each poppet valve 137, 138 and 139 is substantially identical in construction, only one will be described, with like parts of the others being distinguished by prime marks (') and double prime marks (").

A stem 144 engageable with piston 136 is operatively disposed in a bore 145 and terminates in an annular seat 146. Bore 145 is provided with a counterbore 147 that terminates in an annular valve seat 148 in surrounding relationship with seat 146. A further annular valve seat 149 is formed on a spring loaded member 150 that operates in a counterbore 151. Member 150 is biased into engagement with a shoulder 152 by a spring 153 to locate seat 149 in spaced-apart relationship with seat 148. Guidably disposed in bore 147 between seats 148 and 149 is a double faced valve member 154 having seal elements 155 and 156. A spring 157 biases valve member 154 into engagement with seat 148, it being understood that spring 157 is lighter than spring 153. A spring 158 lighter than spring 157 is disposed in a central cavity 159 in stem 144 so as to bear against valve member 154, thus urging stem 144 into engagement with pilot piston 136. A cavity 160 formed between seats 146 and 148 is connected to chamber 62 via a passage 161 and passage 81 in pipe bracket leg 3. A return spring 162 acts on piston 136 to bias the piston in a release position (as shown), in which seat 146 of stem 144 is disengaged from valve element 155. A central passage 163 in stem 144 connects cavity 159 to atmospheric chamber 141. The area defined by the inner periphery of valve seat 149 is connected to brake cylinder chamber 32 via a choke 186, a branch passage 187 and passage 118.

Valve stem 144' of poppet valve 138 differs from stem 144 of poppet valve 137 in that it is without a valve seat and is provided with a fluted passage along its longitudinal length via which cavity 160' is connected to atmospheric chamber 141.

Valve stem 144" of poppet valve 139 differs from either stem 144 or 144' in that it is solid and thus provides no fluid pressure connection between cavity 160" and atmospheric chamber 141. Spring 153" of poppet valve 139 biases a one-way check valve element 164 into engagement with an annular valve seat 165. A branch passage 166 connects the inner periphery of seat 165 to passage 93 via a charging choke 167. A branch passage 168 connects branch passage 166 to the inner periphery of valve seat 149' of poppet valve 138, and a branch passage 169 connects branch passage 166 to the outer periphery of valve seat 149 of poppet valve 137.

Transfer valve 84 comprises a spool valve 170 and a diaphragm-type piston 171 to operate the spool valve in opposition to a return spring 172 acting on the spool. Formed on one side of piston 171 is a pressure chamber 173 containing a piston return spring 174, to which chamber fluid pressure is connected via a branch passage 175 of passage 135. On the opposite side of piston 171 is formed a chamber 176 to which fluid pressure is connected via a branch passage 177 of passage 161. An annular groove 178 of spool valve 170 is arranged in the release position of transfer valve 84 (shown) to connect a passage 179 from the outer periphery of poppet valve seat 149' to a branch passage 179a leading to the inner periphery of valve seat 122 of self-lapping valve assembly 82. An annular groove 180 connects a branch passage 181 of atmospheric passage 102 to a passage 182 leading to cavity 160" of poppet valve 139.

Control valve device 6 also includes a one-way check valve 183 in a passage 184 connected between the inner periphery of application valve seat 105 and spool valve 170.

Another one-way check valve 185 is disposed in a passage 186 between passages 161 and 182. Still another one-way check valve 188 is disposed in a passage 189 connected between branch passages 175 and 179.

OPERATION—CHARGING

Let it now be assumed that pipe bracket 1 is secured to the body of a railway freight car so that this car is provided with the brake cylinder device 7 and the novel brake control valve device 6 of the present invention. Let it also be assumed that this freight car is coupled in a train of cars hauled by a locomotive having a conventional 26-C type engineer's Brake Valve device.

With the handle of this Brake Valve device located in "RELEASE" position, a supply of fluid pressure is connected thereby to brake pipe 90 to charge the train brake pipe to a preselected charged value, which, for example, may be 70 psi. This pressure is connected by way of passage 92 in pipe bracket leg 3 to passage 91 in control valve device 6 to charge chamber 89, chamber 117 via branch passage 119, and chamber 134 via branch passage 119a. This pressure effective under the respective piston abutments 86, 114, and 131 of self-lapping valve assembly 82 forces the assembly to release position, as shown.

With the self-lapping valve assembly in release position, valve element 100 is disengaged from its seat 98 to connect pressure chamber 140 of poppet valve assembly 83 to atmosphere via the unseated valve and passage 102. Consequently, return spring 162 forces diaphragm piston 136 to its release position, as the opposing pressure in chamber 140 is vented, thereby allowing poppet valves 137, 138 and 139 to assume their release positions, as shown.

Accordingly, brake pipe pressure in passage 91 is connected past seat 149" of poppet valve 139 and a restricted orifice in check valve 164, thence via charging choke 167 to passage 166 and passage 93 to charge chamber 89 of piston abutment 86 of control valve device 6. Concurrently, pressure is connected from passage 93 to chamber 41 of brake cylinder device 6 via passage 80 in pipe bracket leg 3.

At the same time, the pressure supplied via charging choke 167 is connected past unseated valve element 156 of poppet valve 137, and via charging choke 186 to passages 187 and 118, whereby pressure is connected to chamber 116 of control valve device 6 and to chamber 32 of brake cylinder device 7 via pipe bracket passage 119 and passage 77.

Also, pressure supplied via charging choke 167 is connected via passages 166 and 168, past unseated valve element 156' of poppet valve 138 to passage 179 and 179a and closed 122/126 of self-lapping valve assembly 82, where it is blanked.

From passage 179, this pressure is further connected to passage 189 and via check valve 188 to pressurize chamber 173 of transfer valve 84 via passage 175, and to also pressurize chamber 133 of piston abutment 131 of self-lapping valve assembly 82 via passage 135, and to also pressurize chamber 63 of brake cylinder positioning cylinder 49 via pipe bracket passage 136 and brake cylinder passage 79.

With pilot piston 136 in release position, stem 144 of poppet valve 137 is forced upwardly by its spring 158 to effect disengagement of its seat 146 from valve element seal 155. Accordingly, pressure in chamber 176 of transfer valve device 84 and positioning cylinder 62 of brake cylinder device 7 is vented to atmosphere via passages 177 and 161, central passage 163 in stem 144, atmospheric chamber 141 and atmospheric passage 102. This venting of pressure from transfer valve chamber 176 establishes a force differential across piston 171, which combines with the force of return spring 172 to positively maintain the transfer valve spool 170 in its release position, while the venting of pressure from positioning cylinder chamber 62 establishes a force differential across piston 59 thereof. In that equal pressures have been established across power piston 15 of brake cylinder device 7, in accordance with the foregoing, return spring 74 is effective with the force differential across positioning piston 59 to urge the power piston 15 in a leftward direction until nut 67 engages the end of boss 75 to establish its release position. In release position of power piston 15, the car brake shoes are retracted from the wheel treads, in a well-known manner, to effect a release of the railway car brakes and the brake equipment is charged.

BRAKE APPLICATION

A brake application may be initiated by effecting a reduction of pressure in brake pipe 90, as by movement of the engineer's brake valve handle from its "RELEASE" position to a chosen position in the service application zone, in the usual well known manner.

As the pressure in brake pipe 90 is reduced, the pressure in chambers 89, 117 and 134 is correspondingly reduced, thereby establishing a pressure differential across piston abutments 86, 114 and 131 of self-lapping valve assembly 82, by virtue of the pressure in the opposing pressure chambers 88, 116 and 133 remaining substantially constant, due to charging chokes 186 and 167 and check valve 188 preventing these pressures from following the brake pipe reduction. The resultant total force differential across these piston abutments drives valve assembly 82 in a downward direction, initially seating valve element 100 on exhaust seat 98 and thence pulling seat 95 away from seated valve element 100. This interrupts atmospheric communication of passage 142 and connects fluid pressure from brake cylinder chamber 41 to passage 142 via passages 80 and 93, chamber 88, central passage 96 in stem 94, and open valve 95/100. Pilot pressure is thus supplied to chamber 140 of poppet valve assembly 83, where it acts on diaphragm piston 136 to simultaneously move the poppet valves 137, 138 and 139 downward to their actuated positions.

At poppet valve 139, brake pipe pressure in passage 91 is cut off to terminate charging of brake cylinder chamber 41 by closure of valve 149"/156". Concurrently, valve 148"/156" is opened to admit brake pipe pressure to atmosphere via passage 182, spool valve groove 180 of transfer valve 84, passage 181 and passage 102. Also, brake pipe pressure is vented to brake cylinder positioning cylinder chamber 62 via branch passage 186 of passage 182, check valve 185, passage 161 and passage 81. This provides local quick service venting of brake pipe pressure to sustain downward deflection of self-lapping valve assembly 82 and to propogate the brake pipe reduction to other cars in the train.

At poppet valve 137, seat 146 on stem 144 engages valve 154 to terminate venting of the positioning cylinder chamber 62 to atmosphere via passage 161, central passage 163 in stem 144, chamber 141, passage 143 and passage 102. At the same time, valve 154 is disengaged from valve seat 148 and engaged with seat 149, thereby connecting pressure from brake cylinder chamber 41 to positioning cylinder chamber 62 via passages 80, 93, 166, 169, seat 148, passage 161 and passage 81. It is to be noted that only a slight drop in pressure occurs in chamber 41 due to its relatively large volume as compared to the volume of chamber 62, such pressure drop being equalized with the pressure in chamber 32 of brake cylinder 7 via check valve 42 thereof.

At poppet valve 138, valve 156' is disengaged from seat 148' and engaged with seat 149', thereby connecting passage 179–179a to atmosphere via seat 148', fluted stem 144', chamber 141, passage 143 and passage 102. Consequently, continued downward deflection of self-lapping valve assembly 82 causes stem 120 of piston abutment 114 to engage and force valve member 125 off its seat 122 and thereby connect the pressure in positioning cylinder chamber 63 to atmosphere via passage 136, passage 135, open valve 122/126 and vented passages 179–179a, it being noted that passage 179 is interconnected via spool valve groove 178 of transfer valve 84. It will now be apparent from the foregoing that chamber 62 of the brake cylinder positioning cylinder 49 is being pressurized, while concurrently, pressure in chamber 63 of the positioning cylinder is vented, thereby establishing a pressure differential across positioning cylinder piston 59 to urge its movement in a rightward direction, as viewed in the drawing of FIG. 1.

When this pressure in positioning cylinder chamber 63 is completely exhausted, a force differential is established across positioning piston 59 sufficient to overcome the resistance of return spring 74 and drive power piston 15 to its extreme right-hand position with a predetermined force corresponding to a minimum service brake application. Conventional linkage may be connected to the power piston rod 34 such that the effective brake force is applied to the railway car brake shoes. This rightward movement of piston 15 is accommodated for by reason of check valve 42 of brake cylinder device 7 providing for the displacement of fluid pressure from chamber 32 to chamber 41, as power piston 15 is moved rightward by positioning piston 59.

The pressure differential to which positioning cylinder piston 59 is subjected is also effective across transfer valve piston 171, so as to force spool 170 from release to applied position against the bias of return spring 174 at substantially the same time as power piston 15 is forced to its rightwardmost position, as above explained. This movement of transfer valve 84 to applied position places spool groove 180 out of communication with passage 81 to terminate quick service reduction of brake pipe pressure to atmosphere. Also, spool groove 178 is placed in communication with passages 179 and 184, for a purpose as hereinafter explained.

Check valve 185 also closes when the back pressure thereon corresponding to the actuating pressure in positioning cylinder chamber 62 reaches a value at which the foregoing minimum service brake application force is produced, to terminate this stage of quick service.

It should be noted at this point that even though piston valve assembly 82 may have deflected downward sufficiently to open exhaust valve 105/109 following prior opening of valves 95/100 and 122/126, the pressure in brake cylinder chamber 32 cannot be vented until power piston 15 has been shifted to its extreme rightward position, since transfer valve spool 170 cuts off the exhaust communication of passage 184 until the transfer valve 84 is shifted to its applied position. This shifting of transfer valve 84 corresponds substantially to the time brake cylinder power piston 15 is shifted by positioning cylinder piston 59 to its extreme right-hand position, in which the volume of chamber 32 is reduced to its smallest size. This sequencing operation thus assures that no reduction of pressure in chamber 32 takes place until the volume of this chamber has been reduced to its smaller value, thereby minimizing the consumption of air during brake applications, as hereinafter discussed.

The relative pressure areas of piston abutments 86, 114 and 131 are such that the loss of pressure from chamber 133 of piston abutment 131 via open exhaust valve 122/126 concurrent with the exhaust of pressure from positioning cylinder chamber 63 restores a force balance condition of piston valve assembly 82, when the brake pipe reduction is at a minimum service value, so as to cause piston valve assembly 82 to move to lap position.

In this lap position of piston assembly 82, exhaust valve 122/126 is closed, exhaust valve 105/109 is closed, and supply valve 95/100 remains open. With exhaust valve 105/109 closed, no further reduction of pressure can be obtained at pressure chamber 32 of brake cylinder device 7, even though spool groove 178 of transfer valve 84, in its applied position, connects passage 184 from this closed exhaust valve 105/109 to atmospheric passage 179. Thus, the differential force acting on positioning piston 59 is the sole source of braking force during a minimum service brake application, since the fluid pressure in brake cylinder chambers 32 and 41 acting on opposite sides of power piston 15 are equalized via check valve 42.

When a subsequent brake pipe reduction in excess of the minimum service reduction is made, as by operation of the engineer's brake valve device in the usual, well known manner, a force imbalance is again created across piston abutments 82, 114 and 131 sufficient to deflect piston valve assembly 82 downward from lap to application position, thereby reopening exhaust valves 105/109 and 122/126. Opening of valve 122/126 is inconsequential, since pressure in positioning cylinder chamber 63, and effective in chamber 133 of piston valve assembly 82, has been previously exhausted. However, opening of valve 105/109 connects pressure from brake cylinder chamber 32 and from chamber 116 of piston assembly 82 to atmosphere via passage 184, check valve 183, spool groove 178, passage 179, valve 148'/156' of poppet valve 138, fluted stem 144', chamber 141, passage 143 and passage 102. This reduction of pressure from brake cylinder chamber 32 creates a fluid pressure differential across power piston 15 in the direction of the right hand, since check valve 42 prevents pressure in chamber 41 from equalizing with pressure in chamber 32. Thus, a force differential is established across power piston 15 to apply brake pressure to the railway car brake shoes in excess of the minimum service brake application previously in effect. The amount of reduction of pressure in chamber 32 and thus the degree of brake application obtained following the minimum service brake application is determined by the differential pressure areas of the respective piston abutments 86, 114 and 131. When the pressure effective in chamber 116 has reduced sufficiently to restore a force balance condition to piston valve assembly 82, the assembly will return to lap position to effect closure of exhaust valve 105/109 and the brake application in effect will be a predetermined ratio of the brake pipe reduction, as 2.5:1 for example. It should thus be apparent from the foregoing that the present invention is operatively compatible with existing conventional AB/D freight brake equipment and may thus be used interchangeably therewith. It will also be apparent that in providing brake application forces consistent with brake forces normally obtained by existing brake equipment, only a minimum amount of air is consumed, due to the reduced volume of brake cylinder chamber 32 from which air pressure is exhausted to obtain the pressure differential force across power piston 15 to apply the brakes.

Whereas the foregoing discussion deals with complete venting of pressure from positioning cylinder chamber 63, a further reduction in air consumption can be gained by limiting this reduction of pressure in chamber 63. Positioning cylinder piston 59 is accordingly sized so as to be actuated by a pressure differential, which is less than the pressure differential that results from complete venting of chamber 63, and which further produces a minimum service brake application force. Transfer valve bias spring 74 is selected so that this reduced pressure differential will actuate piston 171 and spool 170 at substantially the same time as positioning cylinder piston 59 is actuated, thereby connecting passage 179a to passage 135 via passage 175 and transfer valve chamber 173. Consequently, the pressure effective in chamber 133 of piston valve assembly 82 following a minimum service application is thereafter stabilized, by reason of the pressure in chamber 63 being connected to itself via valve 122/126 when a subsequent brake pipe pressure reduction forces the piston valve assembly 82 to application position. This assures that the pressure in chamber 133 of piston abutment 131, as well as the pressure in chamber 88 of piston abutment 86 exerts a constant force on piston valve assembly 82, which is accordingly operative responsively to the reduction of power cylinder chamber pressure effective in chamber 116 of piston abutment 114 to counterbalance the effective brake pipe pressure reduction to force the piston valve assembly back to its lap position. This ratio of power cylinder chamber pressure reduction to brake pipe pressure reduction is thus consistent throughout the brake application range, as in the case where positioning cylinder pressure in chamber 63 is completely vented during a brake application.

BRAKE RELEASE

In order to release the brakes after effecting a brake application in the manner described above, the engineer will move the brake valve handle of the engineer's brake valve device on the locomotive from the position it occupies in its application zone back to its "RELEASE" position. Brake pipe pressure is accordingly supplied via pipe 90 to control valve passage 91 and thence to pressure chambers 89, 117 and 134 to unbalance the piston valve assembly 82 in an upward-acting direction to cause opening of exhaust valve 98/100. Pilot pressure in chamber 140 acting on piston 136 of poppet valve assembly 83 is thus vented via passages 142 and 102 to allow return spring 162 to retract piston 136 to its release position, whereby poppet valves 137, 138 and 139 are also returned by their springs to their normal positions, as shown in FIG. 2A.

Fluid pressure in brake cylinder chamber 41, being only slightly reduced from full brake pipe pressure to which it was initially charged, back flows to brake pipe 90 via passage 80, passage 93, passage 166, choke 167, check valve 164, valve 149"/156", and passage 91 to accelerate the propagation of the brake pipe recharge through the train. Concurrently, this pressure is also connected to brake cylinder chamber 32 via branch passage 169, valve 149/156 of poppet valve 137, choke 186, passage 187, passage 118, passage 119 and passage 77. At the same time, the pressure effective in passage 179 is connected via branch 189, check valve 188, passage 189, passage 175, passage 135, passage 136 and passage 79 to positioning cylinder chamber 63, while pressure in chamber 62 on the opposite side of positioning piston 59 is vented to atmosphere via passage 81, passage 161, valve 146/155, central passage 163 in stem 144, chamber 141, passage 143 and passage 102. As the pressures on opposite sides of power piston 15 and positioning piston 50 thus equalize, spring 74 becomes effective to force piston 15 back to its leftward-most release position.

At this point, the brake shoes are retracted from the vehicle wheels and a complete and direct release of the brakes is attained.

As brake pipe pressure continues to build up, it will eventually exceed the level of the equalized pressures in brake cylinder chambers 32 and 41, whereupon continued charging will continue, as previously explained under "Charging".

Having now described the invention, what I claim as new and desire to secure by Letters Patent, is:

1. Fluid pressure brake apparatus for a railway vehicle operative responsively to variation of fluid pressure in a brake pipe of the vehicle comprising:
   (a) a brake cylinder device including:
      (i) a power cylinder;
      (ii) a piston abutment in said power cylinder and cooperating therewith to form first and second chambers on opposite sides thereof;
      (iii) a positioning cylinder having a diameter less than the diameter of said power cylinder;
      (iv) a piston abutment in said positioning cylinder and cooperating therewith to form third and fourth chambers on the opposite sides thereof, said positioning cylinder piston abutment being connected with said power cylinder piston abutment so as to act cooperatively therewith;
      (v) biasing means for urging said piston abutments in a brake release direction; and
      (vi) means for providing flow of fluid pressure from said first chamber to said second chamber and for preventing flow of fluid pressure from said second chamber to said first chamber; and
   (b) a control valve device including:
      (i) fluid pressure operative pilot valve means having a release position for charging said first and second chambers with fluid pressure carried in said brake pipe and for venting said third chamber when the fluid pressure in said brake pipe is increased, whereby said bias means is effective to move said piston abutment to a brake release position, and having an application position for supplying fluid pressure to said third chamber and for releasing fluid pressure from said first chamber when the fluid pressure in said brake pipe is decreased, to provide a pressure differential across said piston abutments acting in opposition to said biasing means to effect movement of said piston abutments to a brake application position, whereby braking forces are provided in accordance with the force differential thereon; and
      (ii) transfer valve means for preventing said release of fluid pressure from said first chamber until said piston abutments have moved to their said brake application position.

2. Brake apparatus, as recited in claim 1, wherein said control valve device further comprises:
   (a) said fluid pressure operative pilot valve means including a pilot piston; and
   (b) a self-lapping valve assembly having:
      (i) a supply valve operative to connect fluid pressure from said second chamber to said pilot piston to effect actuation of said pilot valve means from said release position to said application position, brake pipe fluid pressure being connected to said fourth chamber in said application position, and released therefrom in said release position;
      (ii) a first exhaust valve operative to release fluid pressure from said first chamber;
      (iii) a second exhaust valve operative to release fluid pressure from said fourth chamber via said fluid pressure operated valve means; and
      (iv) first, second, and third piston abutments, each subject to brake pipe pressure on a corresponding side thereof and on the opposite side to fluid pressure effective in said second chamber, said first chamber, and said fourth chamber respectively, whereby said self-lapping valve assembly is moved to an application position to effect operation of at least said supply valve and said second exhaust valve in response to a reduction of said brake pipe pressure.

3. Brake apparatus, as recited in claim 2, further characterized in that said self-lapping valve assembly in said application position thereof effects operation of said first exhaust valve following operation of said supply valve and said second exhaust valve.

4. Brake apparatus, as recited in claim 3, wherein said transfer valve means comprises:
   (a) a spool member having a first position in which fluid pressure communication is interrupted between said first chamber and atmosphere irrespective of operation of said first exhaust valve, and having a second position in which fluid pressure communication is established between said first chamber and atmosphere via said first exhaust valve;
   (b) a piston with which said spool member is engageable subject on opposite sides to the fluid pressure in said third and fourth chambers; and
   (c) spring means for biasing said piston so as to prevent movement of said spool member from said first position to said second position by said piston until a predetermined pressure differential is established thereacross between the fluid pressure effective in said third and fourth chambers.

5. Brake apparatus, as recited in claim 4, further characterized in that said spool member in said first position connects fluid pressure from said fourth chamber to atmosphere when said second exhaust valve is operated to thereby establish a force differential across said third piston abutment to counterbalance the effect of a predetermined minimum brake pipe reduction on said self-lapping valve assembly sufficient to effect movement thereof from its application position to a lap position in which said first and second exhaust valves terminate the release of fluid pressure from said first and fourth chambers, respectively.

6. Brake apparatus, as recited in claim 5, further characterized in that said spool valve in said second position cuts off venting of said fourth chamber and establishes a fluid circuit therewith to maintain the pressure therein constant any time said second exhaust valve is operated following operation of said transfer valve spool valve to said second position.

7. Brake apparatus, as recited in claim 1 or 5, wherein said fluid pressure operative pilot valve means further comprises:
 (a) a first poppet valve via which fluid pressure in said brake pipe is connected to said first chamber in said release position of said pilot valve means, and to atmosphere and said third chamber in said application position of said pilot valve means; and
 (b) a second poppet valve via which fluid pressure in said first chamber is connected to atmosphere in said release position of said pilot valve means, and via which said first chamber is cut off from said second chamber and said third chamber is cut off from atmosphere in said application position of said pilot valve means.

8. Brake apparatus, as recited in claim 7, wherein said control valve device further comprises means for connecting fluid pressure from said brake pipe to said third chamber in said application position of said pilot valve means until a predetermined pressure is obtained in said third chamber.

9. Brake apparatus, as recited in claim 7, wherein said transfer valve means further provides for terminating the venting of said brake pipe fluid pressure via said first poppet valve device when a predetermined pressure is effective in said third chamber.

10. Brake apparatus, as recited in claim 7, wherein said fluid pressure operative pilot valve means further comprises a third poppet valve that vents the fluid pressure in said fourth chamber to atmosphere via said second exhaust valve and said transfer valve spool in said release position of said pilot valve means, and cuts off venting of said fourth chamber in said application position of said pilot valve means.

11. Brake apparatus, as recited in claim 1, further characterized in that said fluid pressure operative pilot valve means supplies fluid pressure to said third chamber by the equalization of said second chamber fluid pressure therewith.

12. Brake apparatus, as recited in claim 11, further characterized in that the volume of said second chamber is greater than the volume of said third chamber.

* * * * *